United States Patent
Pu et al.

(10) Patent No.: US 6,188,477 B1
(45) Date of Patent: Feb. 13, 2001

(54) OPTICAL POLARIZATION SENSING APPARATUS AND METHOD

(75) Inventors: Chuan Pu; Yu Hwa Lo, both of Ithaca, NY (US)

(73) Assignee: Cornell Research Foundation, Inc., Ithaca, NY (US)

( * ) Notice: Under 35 U.S.C. 154(b), the term of this patent shall be extended for 0 days.

(21) Appl. No.: 09/305,116

(22) Filed: May 4, 1999

Related U.S. Application Data

(60) Provisional application No. 60/084,139, filed on May 4, 1998.

(51) Int. Cl.[7] .................................................. G01B 9/02
(52) U.S. Cl. ........................ 356/351; 356/346; 356/349; 356/368
(58) Field of Search .................................. 356/345, 346, 356/351, 349, 368

(56) References Cited

U.S. PATENT DOCUMENTS

| | | | |
|---|---|---|---|
| 4,572,949 | * | 2/1986 | Bowers et al. ......................... 356/351 |
| 4,799,796 | * | 1/1989 | Musha .................................... 356/351 |
| 5,056,883 | | 10/1991 | Diemeer et al. . |
| 5,097,462 | | 3/1992 | Fujita et al. . |
| 5,375,178 | | 12/1994 | Van Der Tol . |
| 5,481,629 | | 1/1996 | Tabuchi . |
| 5,493,395 | * | 2/1996 | Otsuka .................................. 356/351 |
| 5,629,918 | | 5/1997 | Ho et al. . |
| 5,646,928 | | 7/1997 | Wu et al. . |
| 5,696,856 | | 12/1997 | Van Der Tol . |
| 5,761,350 | | 6/1998 | Koh . |

OTHER PUBLICATIONS

Andrew J. Berger et al., "Feasibility of Measuring Blood Glucose Concentration by Near–infrared Raman Spectroscopy," Spectrochimica Acta Part A 53, p. 287–292, (1997).
Brent D. Cameron et al., "Noninvasive Glocose Sensing Utilizing a Digital Closed–Loop Polarimetric Approach," IEEE Transactions on Biomedical Engineering, vol. 44 (No. 12), p. 1221–1227, (Dec. 1997).
Chien Chou et al., "Noninvasive Glucose Monitoring in Vivo with an Optical Heterodyne Polarimeter," Applied Optics, vol. 37 (No. 16), p. 3553–3557, (Jun. 1, 1998).

* cited by examiner

*Primary Examiner*—Robert H. Kim
(74) *Attorney, Agent, or Firm*—Jones, Tullar & Cooper

(57) ABSTRACT

An integrated polarization sensing apparatus and method uses a self-homodyne detection scheme to provide required sensitivity for numerous applications, such as glucose concentration monitoring, without the need for expensive, bulky components. The detection scheme is implemented by splitting a polarized laser beam with a polarization beam splitter into a P wave component and an S wave component, phase modulating the P wave component and recombining the two components. The polarization of the combined optical beam is then rotated slightly by the variable to be monitored, such as by passing the beam through a glucose solution. Finally, the beam is passed onto a photodetector that generates a signal that is proportional to the polarization rotation angle. This device has the advantage of employing optical components, including polarizing beam splitters, phase modulators and lenses, that can all be fabricated on a single silicon chip using MEMS technology so that the device can be made compact and inexpensive.

20 Claims, 3 Drawing Sheets

OPTICAL POLARIZATION SENSING APPARATUS AND METHOD

CROSS REFERENCE TO RELATED APPLICATIONS

This application claims the benefit under 35 USC 119(e) of U.S. Provisional Application No. 60/084,139, filed May 4, 1998.

BACKGROUND OF THE INVENTION

The present invention relates to optical polarization sensing apparatus and methods that are employed to monitor the change of the polarization state of light to detect and sense signals.

Optical polarization sensing devices have numerous applications, including stress, pressure and temperature sensors, for example. Typically, these devices are fairly large and employ expensive components to achieve a required level of sensitivity. For example, there have been extensive studies conducted on developing non-invasive blood glucose monitoring for diabetes patients because of the inconvenience and danger of the conventional invasive methods, which usually require the patients to cut a finger to give a blood sample. By shining light through human interstitial fluids or blood at translucent dermal positions such as fingertips, ear lobes, or ocular aqueous humor in the eyes, information about the glucose levels can be obtained optically by infrared spectroscopy, Raman spectroscopy or optical polarization changes. Because glucose rotates a polarized light beam's polarization proportionally to its concentration, a phenomenon known as optical activity, various polarimetric glucose sensors have been developed. Examples of these include devices that use Faraday rotators to directly modulate the beam's polarization state, as well as devices that use a Zeeman laser for optical heterodyne detection. However, these methods involve bulk optical components that are expensive and inconvenient.

A need therefore exists for inexpensive, small scale, high sensitivity polarization sensing devices, particularly in certain applications, such as the aforementioned detection of blood glucose levels. In this application, small size and low cost are important to enable the devices to be both portable and affordable so that they may be purchased and used by the diabetic patients without having to visit a medical facility. Another application of these devices is in a magneto-optical disk read head.

One known technique for fabrication of ultra-small micromechanical structures and devices is a polysilicon surface micromachining technique known as MEMS (Micro Electro Mechanical System). With MEMS technology, micro-sized mechanical actuators, sensors and other structures can be integrally formed on single silicon substrates or chips with integrated circuits that control, or receive signals from, the actuators or sensors. To date, however, polarization sensing devices have not been formed using MEMS technology. The necessary sensitivity of the polarization sensing systems, as small as 0.1 to 0.001 degree change in polarization rotation angle, is very hard to achieve with conventional direct detection methods. The conventional light detection schemes can not meet the sensitivity requirement without going through very sophisticated optical systems, which would be much too bulky and expensive, and involve components such as Faraday rotators that are not compatible with the MEMS technology.

SUMMARY OF THE INVENTION

The present invention solves the foregoing problem through provision of polarization sensing devices that, through use of a self-homodyne detection scheme, can employ inexpensive optical components, yet still provide the necessary polarization detection sensitivity. In particular, using the self-homodyne detection scheme enables detection of a polarization change as small as 0.001 degree without requiring use of expensive, bulky components, such as Faraday rotators.

The detection scheme is referred to as self-homodyne because only one laser source is used for the whole system and all of the light beams in the sensing system have the same fundamental optical frequency and laser phase noise, therefore the phase noise can be canceled. The sensing device phase modulates an optical signal generated thereby at a known modulation frequency, and the device uses this modulation frequency to determine light intensity values that are proportional to the change in polarization to be sensed. More particularly, in the preferred embodiments of the invention, spatially coherent light from a laser of a known frequency is incident on a polarization beamsplitter that splits the beam into a transmitted beam and a reflected beam whose electric field components are perpendicular to one another. One of the beams, e.g., the transmitted beam, is modulated by a phase modulator that changes the phase of the optical wave periodically in addition to the fundamental optical wave phase oscillation, but at a much lower frequency. The modulated beam is then recombined with the unmodulated reflected beam, and sensed by a photodetector.

If the incident laser beam is polarized, and prior to passing through the polarization beamsplitter, the polarization is rotated slightly, this rotation will cause the modulated and reflected beams to interfere with one another when they are combined. The same interference occurs if the combined beam has its polarization rotated, and is then passed through a polarizer to pass only one of the polarization states. In both cases, the intensity of the combined beam sensed by the photodetector is related to the amount of interference, which in turn is related to the value of the polarization rotation angle. If the polarization rotation angle is in proportion to the value of a variable to be sensed, e.g., temperature, pressure, stress, glucose concentration, etc., then the sensed intensity is also related to the value of the variable to be sensed. The photodetector linearly converts the laser light intensity, which is the square of the laser electrical field, into a photocurrent. Finally, the photocurrent is analyzed in the frequency domain to get a spectrum of the photocurrent. By measuring harmonics of the modulation frequency from the spectrum, the value of the polarization rotation angle, and thus the value of the sensed variable, can be determined.

With this arrangement, the intensity of the polarized beam is directly proportional to the polarization rotation angle imparted to the combined beam by the variable to be sensed. This is in contrast to other direct measurement techniques wherein the intensity of the received beam is proportional to the square of the rotation angle. As a result, the sensitivity of the device is increased by several orders of magnitude, and the device can thus be employed to measure glucose concentrations, for example, without the use of expensive bulky components. This, in turn, permits the core devices employed in the embodiments of the invention, including the polarization beamsplitter, phase modulator, lenses, etc., to be simple devices that can all implemented on a single silicon chip using MEMS, or similar technology.

BRIEF DESCRIPTION OF THE DRAWINGS

The features and advantages of the present invention will become apparent from the following detailed description of a preferred embodiment thereof, taken in conjunction with the accompanying drawings, in which.

DETAILED DESCRIPTION OF THE PREFERRED EMBODIMENTS

Figure 1:
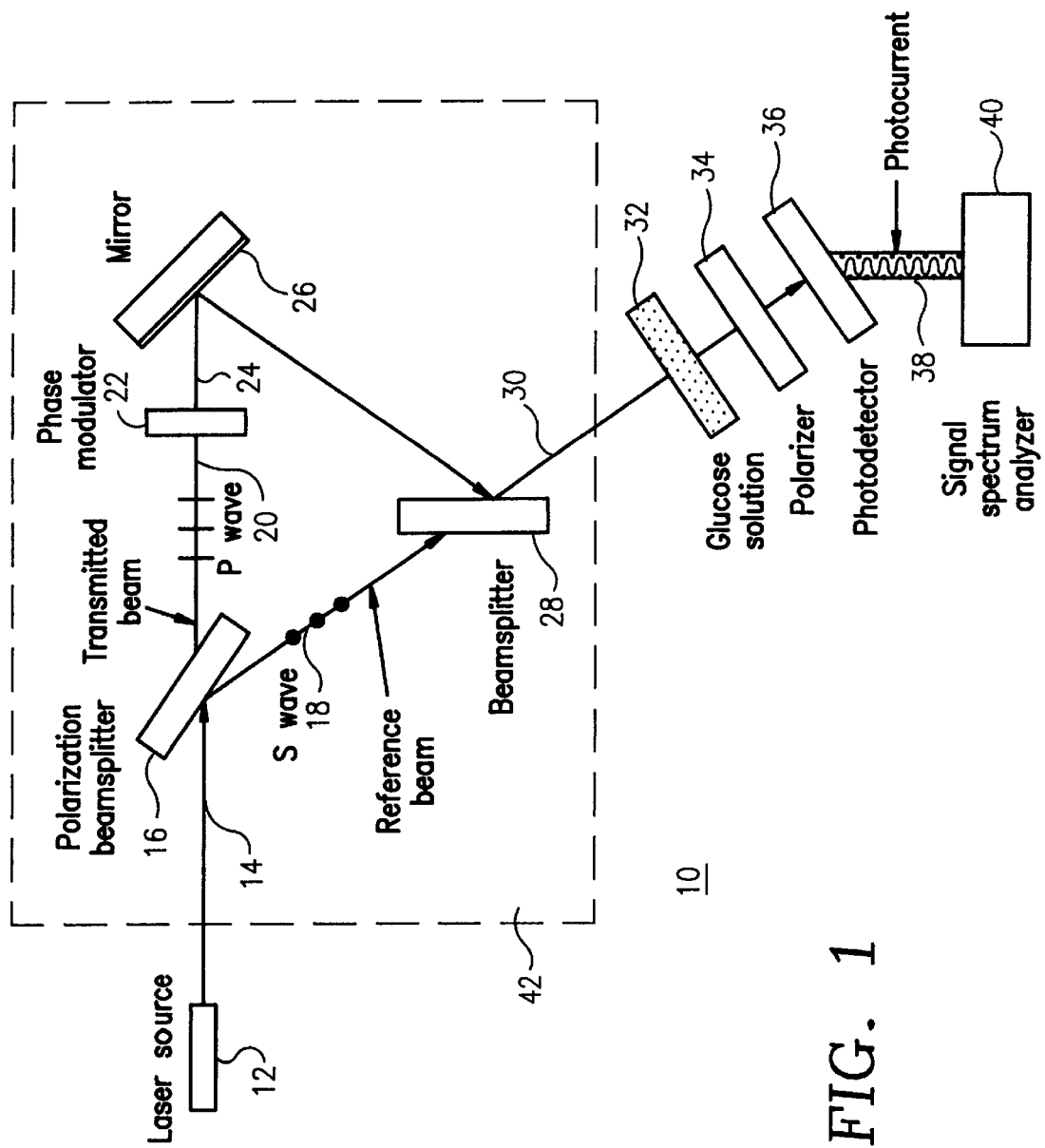
FIG. 1 is a schematic illustration of an embodiment of the present invention that is employed for glucose concentration detection.

With reference first to FIG. 1, a first preferred embodiment of the present invention is illustrated comprising a glucose detection system 10 that can be employed for noninvasively determining an individual's glucose concentration level. A laser source 12 generates a spatially coherent red laser beam 14 of known frequency. This beam 14 is first split according to its polarization state or sense by a Polarization Beam Splitter (PBS) 16, utilizing the polarizing Brewster angle of an oblique incident light beam. The polarization state or sense of a laser refers to the direction of the electrical field for the electromagnetic light wave. There are two independent components for a polarized light. The direction of the incident beam 14 and the direction of a reflected beam 18 form an incident plane. The component whose electrical field is parallel to the incident plane is defined as a P wave, and the other component whose electrical field is perpendicular to the incident plane is defined as an S wave. The PBS 16 totally transmits the P wave as a transmitted beam 20, and reflects the S wave as the reflected beam 18. Thus, the transmitted beam 20 has a polarization state or sense that is perpendicular to the polarization state or sense of the reflected beam 18.

The transmitted beam 20 is modulated by a phase modulator 22, which changes the phase of the optical wave periodically in addition to the fundamental optical wave phase oscillation, but at a much lower frequency (e.g., on the order of kilohertz as opposed to hundreds of terahertz for the laser frequency). The resulting modulated beam 24 is reflected by a mirror 26 and is recombined with the reflected beam 18 (also denoted as a reference beam) by a beamsplitter 28 to generate a combined beam 30.

The combined beam 30 passes through a glucose solution 32 whose concentration is to be determined. For practical use, the collimated and polarized laser beam would be transmitted through the aqueous humor inside a human eye, for example. The glucose in the aqueous humor rotates the polarization of the light by a small angle, in proportion to the concentration of the glucose level inside the humor, which is related to the blood glucose level.

After passing through the glucose solution 32, the combined beam 30 passes through an optical polarizer 34, which is preferably a Glan-Thompson polarizer with a $10^5$: 1 extinction ratio. The purpose of the polarizer 34 is to pass only one polarization state of the combined beam 30, and the intensity of this passed state varies, depending on the amount of rotation imparted by the glucose solution 32. Finally, the combined beam 30 is incident on a conventional photodetector 36, such as a silicon photodetector. The photodetector 36 linearly converts the laser light intensity, which is the square of the laser electrical field, into a photocurrent 38. The photocurrent 38 is then analyzed in the frequency domain, such as by using a signal spectrum analyzer 40, to get a spectrum of the photocurrent. By measuring harmonics of the modulation frequency from the spectrum, the polarization rotation angle, and thus the glucose level of the solution 32, can be detected.

It should be noted that the arrangement of the system elements in FIG. 1 can be changed in a number of ways without affecting the system's operation. In particular, the glucose solution 32 and the polarizer 34 could be moved between the laser source 12 and the PBS 16 so that the laser beam 14 would first pass through the polarizer 34, then the glucose solution 32, and finally to through the PBS 16. The result would still be the same with the intensity of the combined beam 30 being related to the polarization rotation angle imparted by the glucose solution 32. However, the arrangement in FIG. 1, where the polarizer 34 is the last element before the photodetector 36, is preferred for glucose sensing because it is less sensitive to noise. This is an important consideration because the required polarization rotation angle sensitivity is on the order of 0.001 degree for this embodiment, and noise must be minimized. In addition, it should also be noted that in the variation where the glucose solution 32 is positioned between the laser source 12 and the PBS 16, the polarizer 34 may be omitted if the light generated by the laser source is 12 is already highly polarized. Furthermore, the reflected beam 18 can be the beam that is modulated by the phase modulator 22 instead of the transmitted beam 20. However, for the analysis that follows, it is assumed that the transmitted beam 20 is the one that is phase modulated.

The principles of the self-homodyne detection scheme employed by the detection system 10 are illustrated as follows. The electrical field of the modulated beam 24 (P wave) can be written as $$E_{mo} = A_{mo}\cos(\omega t + D\cos(ft)) \quad (1)$$

where $A_{mo}$ is the amplitude of the modulated beam 24, $\omega$ is the optical wave frequency, f is the phase-modulation frequency with typical values ranging from several hundred hertz to kilohertz, and D is the modulation depth typically smaller than $\pi/2$. For the reference or reflected beam 18 (S wave), the electric field is $$E_{re} = A_{re}\cos(\omega t + \phi) \quad (2)$$

where $A_{re}$ is the amplitude of the reference beam 18, and $\phi$ is the phase offset of the two beams 18 and 24 because of their unequal optical paths before being combined together.

Figure 2A:
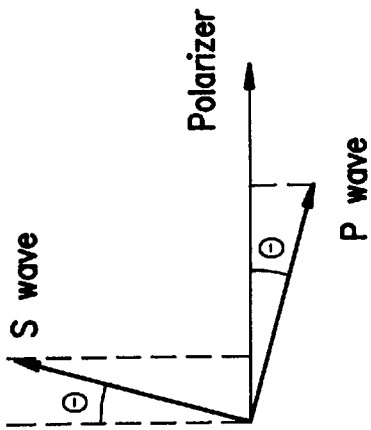
FIGS. 2A and 2B are schematic illustrations showing the polarization state of a light beam in the first embodiment before and after passing through a glucose solution whose concentration is to be determined.
Figure 2B:
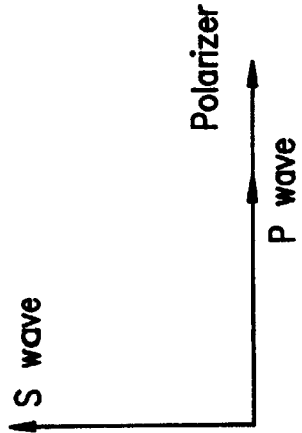

If the two beams forming the combined beam 30 enter the final polarizer 34 without passing through the glucose solution 32, they will not interfere because they are perpendicular to each other as illustrated in FIG. 2A. However, since the glucose solution 32 rotates the polarization states, after passing through it, these two beams will interfere because they both have projections on the polarizer's passing direction, as shown in FIG. 2B. The rotation angle θ is determined by the special rotation of glucose according to $\theta = [\alpha]_\lambda^T \text{ph} \times C \times L$, where $[\alpha]$ is the special rotation of glucose related to the optical wavelength, temperature and pH value of the solution, C is the glucose concentration, and L is the optical path length. For red light $[\alpha]$ is around $4*10^{-5}$ degree per mg/dl*cm. Thus for red light (633 nm) and a 1 cm optical length, a 100 mg/dl glucose concentration will cause a θ of 0.004 degree. A human being's normal blood glucose level is around 100 mg/dl and the clinically required accuracy is mg/dl, which only causes a rotation of $4*10^{-5}$ degree.

Through the interference between the two beams in the combined beam 30 that is caused by the polarization rotation impaired by the glucose solution 32, the light intensity on the surface of the photodetector is given by $$I_{de}=(E_{mo}\cos\theta+E_{re}\sin\theta)^2=I_{dc}+I_{ac} \quad (3)$$

where $I_{dc}$, $I_{ac}$ are the DC and AC components, respectively. The glucose information is embedded in $I_{ac}$ given by $$I_{ac}=2A_{mo}A_{re}\sin\theta\cos\theta\cos(D\cos(ft)-\phi)I_{ac}=A_{mo}A_{re}*\sin(2\theta)* \quad (4)$$

$$I_{ac} = 2A_{mo}A_{re}\sin\theta\cos\theta\cos(D\cos(ft)-\phi) \quad (4)$$
$$I_{ac} = A_{mo}A_{re}*\sin(2\theta)*$$
$$\left\{ \begin{array}{l} \cos(\phi)[J_0(D)-2J_2(D)\cos(2ft)+\ldots]+ \\ \sin(\phi)[2J_1(D)\cos(ft)-2J_3(D)\cos(3ft)+\ldots] \end{array} \right\}$$

where $J_0(D)$, $J_1(D)$, $J_2(D)$ . . . are Bessel functions. There are several ways to analyze the signals, such as demodulating the photocurrent with the electrical spectrum analyzer 40 to get a spectrum, or by using a lock-in amplifier to sort out signals at a certain frequency. In the frequency domain there are signals at harmonics of the phase modulation frequency, namely, f, 2f, 3f . . . , whose amplitudes are linearly responsive to sin ($2\theta$). For example, at modest modulation depth, the signal is the strongest at f, and since $\theta$ is very small, the spectrum signal at f could be approximated as:

$$F_I(f)\approx 2\theta*A_{mo}A_{re}\sin(\phi)*2J_1(D) \quad (5)$$

where $F_I$ is the Fourier transform of the photocurrent. Clearly $F_I(f)$ is linearly proportional to $\theta$. Compared with a direct intensity detection scheme where $\theta^2$ is detected, self-homodyne coherent detection is several orders of magnitude better because $\theta$ is on the order of a millidegree.

There are several sources of noise that might affect the measurement. At first, from eq. (5), obviously the stability of the initial phase offset $\phi$ is critical. The vibration of the system components and airflow could cause $\phi$ to drift over a long period of time and create phase noise. A full integration of the system 10 and packaging could reduce the $\phi$ drifting. In addition, $\phi$ can be intentionally tuned over a phase range of $2\pi$ by adjusting the optical path of one beam over the range of the optical wavelength, such as by changing the position of the mirror 26 for the transmitted beam 20. This would permit sin ($\phi$) to reach its maximum value of 1 during the tuning range. Then, a peak-holding method can be used during the tuning to get the maximum spectrum value at the modulation frequency. In this way, the drifting $\phi$ factor can be eliminated dynamically. Another method is to calibrate the system 10 with a solution of a known glucose concentration, and measure an unknown glucose solution afterwards, so that the $\phi$ factor could be canceled. Secondly, limited by the performance of the PBS 16, neither the transmitted beam 20 nor the reflected beam 18 can be a purely polarized light. They will both have a certain amount of cross-polarization in addition to their principal polarization. For example, the reflected or reference beam 18 will have small amount of P wave in addition to its principal S wave, and this will cause residual interference in addition to the interference caused by glucose. To compensate for this, a solution with zero glucose concentration can be measured first to determine only the residual interference so that it can be subtracted from the following glucose measurements.

Figure 3:
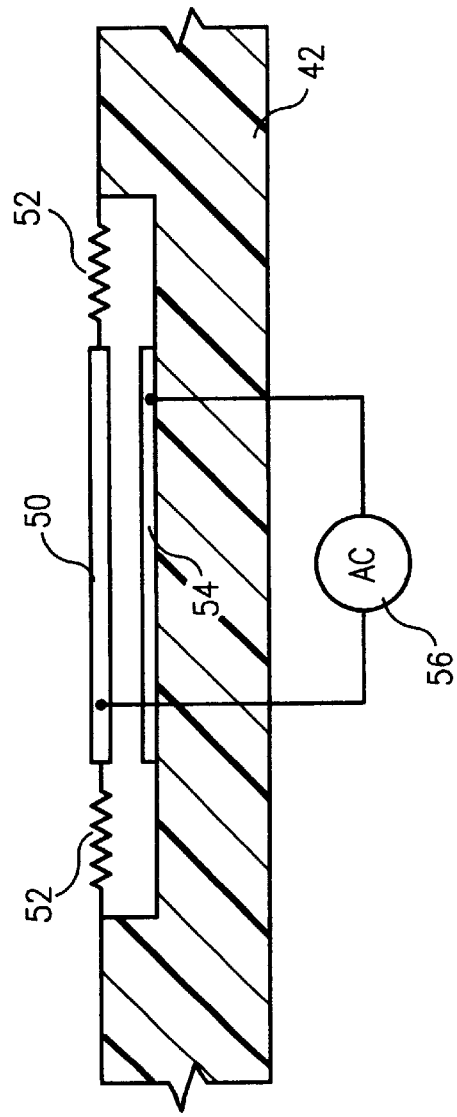
FIG. 3 is a schematic illustration of a MEMS based phase modulator that can be employed in the embodiments of the invention.

With the advent of Si free space micro-optics technology, all the passive optical devices shown inside the box in FIG. 1 can readily be built on a single Si chip 42, which can greatly reduce the cost and enhance the performance of a compact non-invasive glucose sensor. As illustrated in FIG. 3, the phase modulator 22 is preferably an electrostatically driven polysilicon membrane 50, which is suspended from the Si chip 42 by polysilicon flexures 52. The polysilicon membrane 50 forms a first electrode that is connected, along with a second fixed electrode 54, to an AC source 56. With this arrangement, the polysilicon membrane 50 undertakes piston-like movements when driven by an AC source 56. Since the moving range is on the order of sub-microns, which are close to the optical wavelength, the membrane 50 effectively changes the phase of the reflected light without affecting the light intensity.

The MEMS technology that is particularly suitable for these applications includes polysilicon surface micromachined microhinge processes which foundry services have made available. The microhinge design allows one to lift the preprocessed polysilicon devices from the plane of the substrate to form a micro-optic bench. With this design, the polarization beamsplitter, micromirrors and the regular beamsplitter are made of polysilicon thin film fastened to the silicon substrate with micromechanical hinges and latches.

The simplest polarization beamsplitter may be made of simply a polysilicon thin layer. At a particular incident angle of the light beam, the TM polarized light (also denoted as P wave in the previous text, where the E-field of the light beam is parallel to the incident plane) will experience a 100% transmission, whereas part of the TE polarized light (also denoted as S wave in the previous text, where the E-field of the light beam is perpendicular to the incident plane) will be transmitted and part will be reflected. As a result, the reflected beam will be purely TE polarized (TM is 100% transmitted) and the device functions as a polarizer. If one chooses the right polysilicon thickness, the interference effect could significantly cut off the transmitted TE beam and leave the transmitted beam to be almost purely TM polarized. Thus the device functions as a polarization beamsplitter. The purity of the polarization state of reflected and transmitted beams can be easily enhanced by two methods: employing multilayer coating on the polysilicon plate, or cascading several devices in tandem. In principle, using the above polarization sensitive devices, the MEMS devices can detect polarization changes quite easily. For the front-end detection, a high quality polarizer as good as a Glan-Thompson polarizer can be built with smooth bulk silicon chips, using the polarizing Brewster angle for oblique incident light. The spectrum analysis can also be achieved by IC (Integrated Circuit) designed filters. In this way the size and the cost of the whole system could be reduced.

For device fabrication, a three layer polysilicon foundry process (MUMPs process of MCNC) can be used, although a polysilicon process with good surface roughness and flatness control is preferably used, such as the SUMMiT (Sandia Ultra-planar Multi-level MEMS Technology). The use of the later process is preferred because excessive surface roughness and the overall curvature of the polysilicon devices significantly hamper the high sensitivity interferometric measurements that are made by the preferred embodiments. To increase the optical reflectivity of the device components, a layer of 650 Å Gold with 250 Å Chrome for adhesion is preferably evaporated on the surfaces of the polysilicon micro-mirror 26 and the phase modulator 22. The devices are then preferably released in 49% hydrofluoric acid and coated with a Self-Assembled Monolayer to reduce the surface stiction. Finally, the devices are then lifted up with vacuum tweezers and micro-probes and fixed to the silicon chip 42 by micro-hinges and micro-spring latches.

Figure 4:
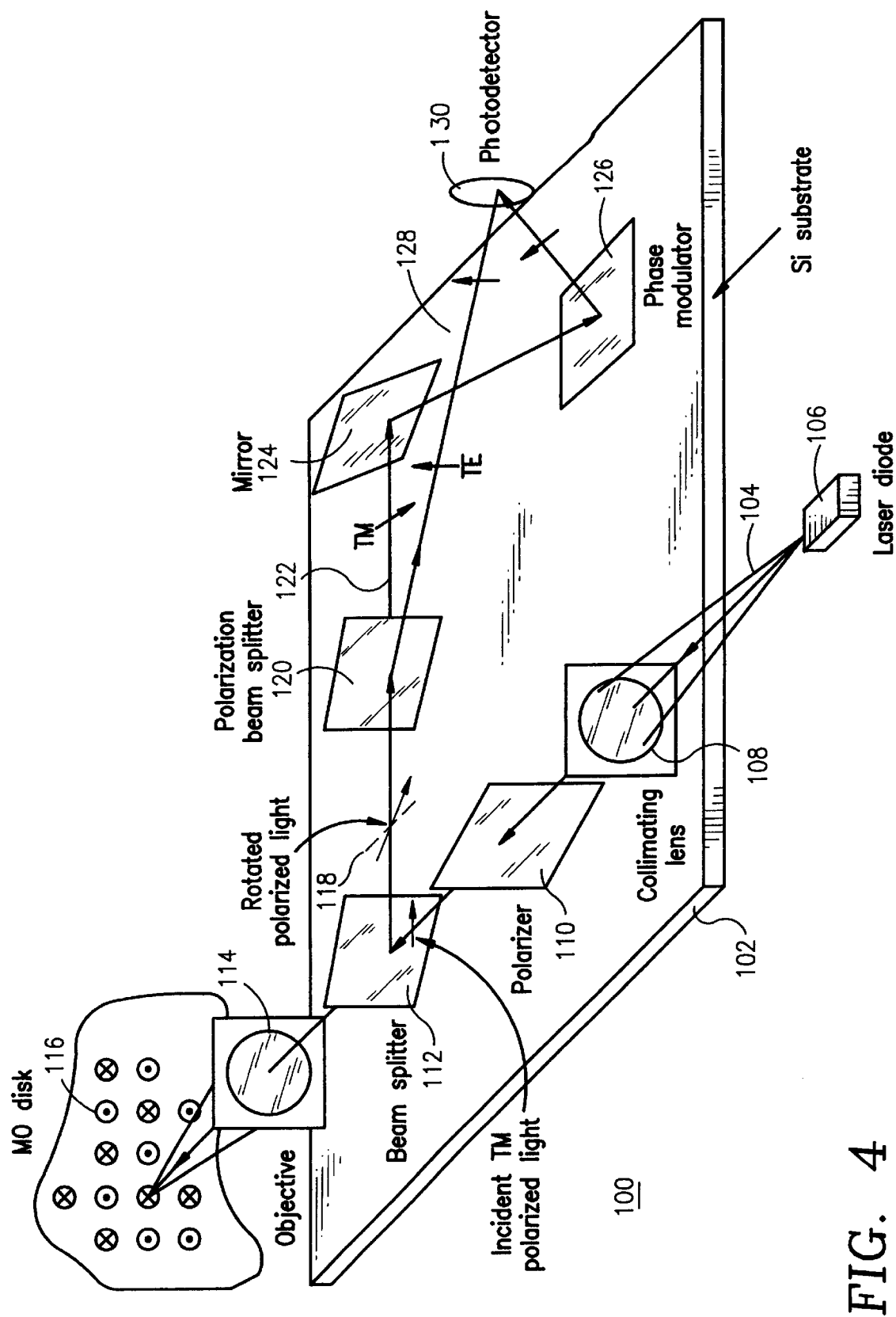
FIG. 4 is a schematic illustration of a second embodiment of the present invention that is employed for a magneto-optical disk read-out head.

Another potential application of the present invention is an integrated Magneto-optical (MO) disk readout head. FIG. 4 shows a schematic diagram of such a readout head 100. An MO disk consists of a magnetic layer and the stored digital information is represented by the direction of the magnetization vector. Due to the polar Kerr effect, when a beam of linearly polarized light is incident on an MO disk, its plane of polarization will undergo a slight rotation upon reflection. The sense of rotation depends on the direction of the magnetization vector, and could then be detected by the MO readout head 100.

As with the glucose detection embodiment of FIG. 1, it becomes feasible that the whole MO readout head 100 could be integrated on a single Si chip 102. As depicted in FIG. 4, an incident laser beam 104 out of a laser source or diode 106 is passed through a collimating lens 108, and is then polarized parallel to the substrate (TM polarization) by a polarizer 110. The beam 104 then passes through a beam-splitter 112 and an objective lens 114, after which it is reflected off of the MO disk 116. Upon reflection from the MO disk 116, the polarization state rotates slightly, and the reflected beam 118 is directed by the beamsplitter 112 to a PBS 120. As in the first embodiment, the PBS 120 separates the beam 118 into a transmitted P wave beam 122 and a reflected S wave beam 124. The P wave beam 122 is directed to a mirror 124 and a phase modulator 126, and the reflected S wave beam 128 is directed to a photodetector 130 where it is recombined and interferes with the P wave beam 122. In this manner, the polarization angle rotation imparted by the MO disk 116 is related to the intensity of the combined beam received by the photodetector 130 that can be spectrum analyzed as in the first embodiment. It should be noted that the positioning of the polarizer 110 in this embodiment is not as important as in the first embodiment. This is because the required sensitivity for the MO embodiment is on the order of 0.5 degrees, and noise is not as much of a concern for this sensitivity level. Once again, the polarizer 110 can be omitted if the light from the laser source 106 is already highly polarized.

The merits of the present invention can be summarized as follows:

(1) Using self-homodyne detection, the signal generated by the photodetector is proportional to the small polarization rotation angle induced by the glucose, or other variable to be sensed, rather than to the square of the angle as in direct detection, thus increasing the detection sensitivity by several orders of magnitude. In tests on a prototype glucose detection system, a resolution level around 75 mg/dl was achieved, which is close to the requirement for clinical use. By using a polysilicon process with better surface roughness and flatness control, further improvements in resolution could be obtained.

(2) As one way of implementation, every passive optical component in the system can be fabricated on a single silicon chip using MEMS technology. This offers a compelling advantage in cost, size, and reliability. In this way the whole sensing system can be made into a small, hand-held module mounted on, for example, a glass frame to directly detect the glucose level of a diabetic patient to help control the insulin intake in a regular base without breaking the skin cell barrier.

(3) The signal and the phase-modulated beam are generated by the same laser source or diode, hence their phase noise cancels. This relaxes the requirement on the laser linewidth. In fact a conventional single mode laser may already be adequate for this application since the laser mode spacing is in the range of several gigahertz, well above the phase modulation frequency.

Although the present invention has been disclosed in terms of a number of preferred embodiments and variations thereon, it well be understood that numerous additional variations and modifications could be made thereto without departing from the scope of the invention as set forth in the following claims. For example, the self-homodyne detection scheme can be applied to any application where polarization rotation is to be detected. Further, although the preferred embodiments are particularly suited for implementation using MEMS technology, the devices can be constructed using any conventional fabrication technique if desired.

What is claimed is:

1. Apparatus for sensing polarization rotation of an optical beam comprising:
   a) an optical beam source for generating a first optical beam of a first known frequency;
   b) a polarization beamsplitter for receiving said first optical beam and forming first and second component beams, a first of which is a transmitted beam having a first polarization sense and a second of which is a reflected beam having a second polarization sense that is perpendicular to said first polarization sense;
   c) a phase modulator for phase modulating one of said first and second component beams and thereby generating a phase modulated beam, said phase modulator operating at a second known frequency that is lower than said first known frequency;
   d) a beamsplitter for combining said phase modulated beam with the other of said first and second component beams, and thereby forming a combined optical beam; and
   e) a photodetector for receiving said combined optical beam and generating a photocurrent that is related to a polarization rotation angle that is imparted to either said first optical beam or said combined optical beam.

2. The apparatus of claim 1, wherein said first optical beam is a polarized spatially coherent optical beam, and said source is a laser.

3. The apparatus of claim 1, further including a polarizer positioned between said beamsplitter and said photodetector for passing only a single polarization state of said combined optical beam onto said photodetector.

4. The apparatus of claim 3, further including means positioned between said beamsplitter and said polarizer for rotating a polarization angle of said combined optical beam.

5. The apparatus of claim 4, wherein said means for rotating is responsive to a parameter to be sensed by said apparatus.

6. The apparatus of claim 5, wherein said parameter is selected from the group comprising temperature, pressure, stress, glucose concentration and state of a magneto-optical disk.

7. The apparatus of claim 1, further including a polarizer positioned between said optical beam source and said polarization beamsplitter for polarizing said first optical beam.

8. The apparatus of claim 3, further including means positioned between said polarizer and said optical beamsplitter for rotating a polarization angle of said combined optical beam.

9. The apparatus of claim 8, wherein said means for rotating is responsive to a parameter to be sensed by said apparatus.

10. The apparatus of claim 9, wherein said parameter is selected from the group comprising temperature, pressure, stress, glucose concentration and state of a magneto-optical disk.

11. The apparatus of claim 1, further including a spectrum analyzer for receiving said photocurrent generated by said photodetector, and analyzing the frequency spectrum of the photocurrent to determine the polarization rotation angle of said combined optical beam.

12. The apparatus of claim 1, wherein said polarization beamsplitter, said phase modulator and said beamsplitter are formed on a single silicon chip using MEMS fabrication technology.

13. The apparatus of claim 1, further comprising a mirror positioned between said phase modulator and said beamsplitter for reflecting said phase modulated beam toward said beamsplitter.

14. The apparatus of claim 1, wherein said polarization beamsplitter, said phase modulator, said mirror and said beamsplitter are formed on a single silicon chip using MEMS fabrication technology.

15. A method for sensing a polarization rotation angle of an optical beam comprising the steps of:
    a) generating a first optical beam of a first known frequency;
    b) splitting said first optical beam into first and second component beams, a first of which has a first polarization sense and a second of which has a second polarization sense that is perpendicular to said first polarization sense;
    c) phase modulating one of said first and second component beams at a second known frequency that is lower than said first known frequency and thereby generating a phase modulated beam;
    d) combining said phase modulated beam with the other of said first and second component beams, and thereby forming a combined optical beam; and
    e) detecting an intensity of said combined optical beam, and
    f) determining a polarization rotation angle of said combined beam from said intensity.

16. The method of claim 15, wherein said first optical beam is a polarized spatially coherent optical beam generated by a laser.

17. The method of claim 15, further comprising the step of polarizing one of said first optical beam and said combined optical beam.

18. The method of claim 16, further comprising the step of rotating a polarization rotation angle of one of said first optical beam and said combined optical beam in response to a parameter to be sensed.

19. The method of claim 17, further comprising the step of rotating a polarization rotation angle of one of said first optical beam and said combined optical beam in response to a parameter to be sensed.

20. The method of claim 19, wherein said parameter is selected from the group comprising temperature, pressure, stress, glucose concentration and state of a magneto-optical disk.

* * * * *